United States Patent
Zhang et al.

(10) Patent No.: US 11,789,997 B2
(45) Date of Patent: Oct. 17, 2023

(54) IMAGE RECOGNITION METHOD AND APPARATUS, ELECTRONIC DEVICE, AND MEDIUM

(71) Applicant: BEIJING BAIDU NETCOM SCIENCE AND TECHNOLOGY CO., LTD., Beijing (CN)

(72) Inventors: Miao Zhang, Beijing (CN); Qun Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 120 days.

(21) Appl. No.: 17/025,320

(22) Filed: Sep. 18, 2020

(65) Prior Publication Data

US 2021/0264142 A1   Aug. 26, 2021

(30) Foreign Application Priority Data

Feb. 21, 2020   (CN) .......................... 202010108757.8

(51) Int. Cl.
*G06F 18/22*   (2023.01)
*G06F 16/58*   (2019.01)
(Continued)

(52) U.S. Cl.
CPC .......... *G06F 16/5866* (2019.01); *G06F 18/22* (2023.01); *G06V 10/764* (2022.01);
(Continued)

(58) Field of Classification Search
CPC ...... G06V 40/10; G06V 40/16; G06V 40/174; G06V 10/82; G06V 10/92; G06K 9/6201;
(Continued)

(56) References Cited

U.S. PATENT DOCUMENTS

2014/0279310 A1*   9/2014   Fossella ................. G06Q 40/12
                                                              705/30
2016/0188131 A1*   6/2016   Ubillos ............... G06F 3/04847
                                                              715/841
(Continued)

FOREIGN PATENT DOCUMENTS

CN         103605971 A         2/2014
CN         108933723 A    *   12/2018   ........... H04L 51/063
(Continued)

OTHER PUBLICATIONS

Liu, et al., Intelligent and secure content-based image retrieval for mobile users, IEE Access, 7:119209-119222 (2019).
(Continued)

*Primary Examiner* — John Villecco
*Assistant Examiner* — Kathleen M Broughton
(74) *Attorney, Agent, or Firm* — Knobbe, Martens, Olson & Bear LLP

(57) ABSTRACT

Embodiments of the present disclosure provide an image recognition method and apparatus, an electronic device and a medium, and relates to the field of image processing. The method may include: acquiring a to-be-recognized image sent by a client, and determining whether the to-be-recognized image is a back image; determining characteristic information of the to-be-recognized image in at least one dimension, when it is determined that the to-be-recognized image is the back image; and determining a target front side image matching the to-be-recognized image according to the characteristic information, and returning the target front side image to the client to cause the client to display the target front side image.

8 Claims, 9 Drawing Sheets

(51) Int. Cl.
*G06V 40/10* (2022.01)
*G06V 40/16* (2022.01)
*G06V 10/764* (2022.01)
*G06V 10/82* (2022.01)
*G06V 10/94* (2022.01)

(52) U.S. Cl.
CPC .............. *G06V 10/82* (2022.01); *G06V 10/94* (2022.01); *G06V 40/10* (2022.01); *G06V 40/16* (2022.01); *G06V 40/174* (2022.01)

(58) Field of Classification Search
CPC . G06K 9/6271; G06F 16/5866; G06F 16/953; G06F 16/5854; G06F 16/5838
See application file for complete search history.

(56) References Cited

U.S. PATENT DOCUMENTS

| | | | | |
|---|---|---|---|---|
| 2016/0360098 | A1* | 12/2016 | King | G06F 3/0487 |
| 2017/0286372 | A1* | 10/2017 | Chellam | G06Q 30/0601 |
| 2018/0232932 | A1* | 8/2018 | Moll | G06T 13/60 |
| 2018/0295396 | A1* | 10/2018 | Ramadorai | H04N 21/2743 |
| 2019/0037173 | A1* | 1/2019 | Lee | G06F 3/04842 |
| 2019/0200872 | A1* | 7/2019 | Matsuoka | A61B 5/0013 |

FOREIGN PATENT DOCUMENTS

| | | | | |
|---|---|---|---|---|
| CN | 108960209 A | | 12/2018 | |
| CN | 109784243 A | | 5/2019 | |
| CN | 110069652 A | * | 7/2019 | |
| CN | 110136236 A | * | 8/2019 | ............ G06T 13/40 |
| CN | 110163082 A | | 8/2019 | |
| JP | 2010218373 | | 9/2010 | |
| JP | 2014109864 | | 6/2014 | |
| JP | 2016134921 | | 7/2016 | |
| JP | 2017062633 | | 3/2017 | |
| JP | 2017097904 A | * | 6/2017 | |
| JP | 2018190398 | | 11/2018 | |
| JP | 2019159537 A | | 9/2019 | |
| KR | 2012-0103327 A | | 9/2012 | |

OTHER PUBLICATIONS

Mühling, et al., Content-based video retrieval in historical collections of the German broadcasting archive, TPDL 2016, LNCS 9819:67-78 (2016).

Shi, et al., Transferring a semantic representation for person re-identification and search, IEEE 4184-4193 (2015).

He et al., "Research on General Targets Tracking and Extraction of Video Based on Self-Resemblance", Computer Knowledge and Technology, vol. 14, No. 04, Feb. 2018, ISSN 1009-3044, 3 pages.

* cited by examiner

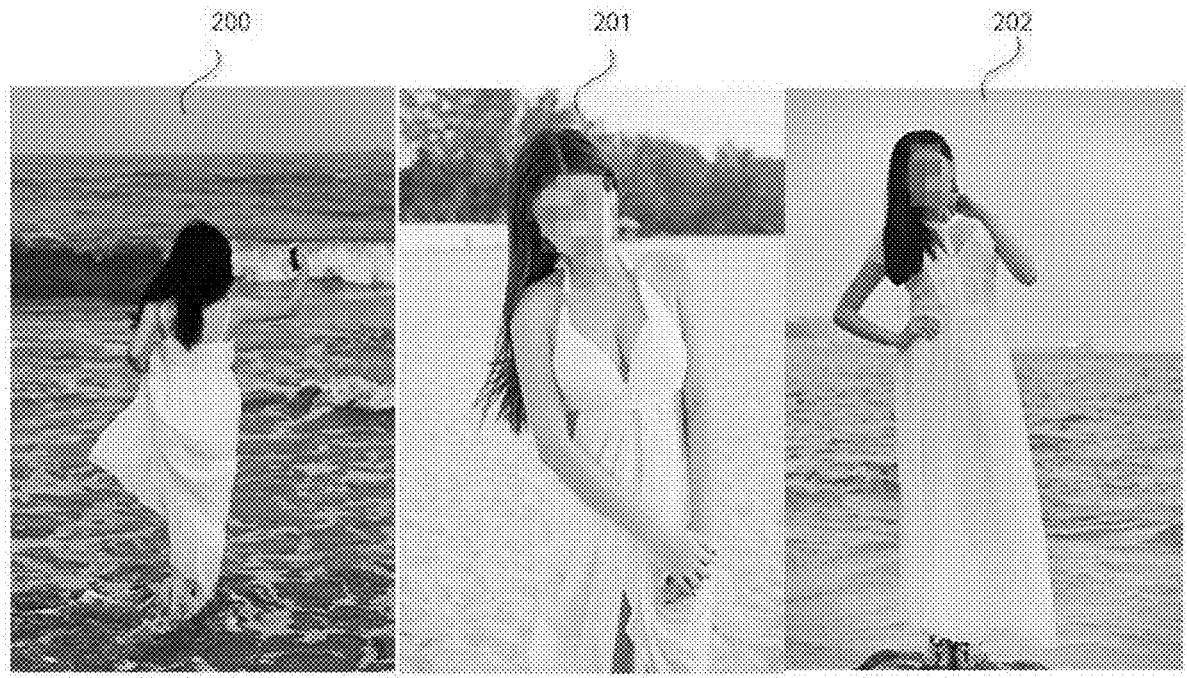

Fig. 2B

```
┌─────────────────────────────────────────────────────────┐
│ Sending a to-be-recognized image to a server side, to cause the │
│ server side to determine a target front side image matching the │──── S301
│ to-be-recognized image according to the to-be-recognized image │
└─────────────────────────────────────────────────────────┘
                              │
                              ▼
┌─────────────────────────────────────────────────────────┐
│ Acquiring the target front side image sent by the server side and │──── S302
│ displaying the target front side image in a visualization area │
└─────────────────────────────────────────────────────────┘
```

Fig. 3A

IMAGE RECOGNITION METHOD AND APPARATUS, ELECTRONIC DEVICE, AND MEDIUM

CROSS-REFERENCE TO RELATED APPLICATIONS

This application claims priority to Chinese Patent Application No. 202010108757.8, filed on Feb. 21, 2020, titled "Image recognition method and apparatus, electronic device and medium," which is hereby incorporated by reference in its entirety.

TECHNICAL FIELD

Embodiments of the present disclosure relate to the computer technology, particularly to the image processing technology, and specifically to an image recognition method and apparatus, an electronic device and a medium.

BACKGROUND

A conventional image search technique refers to that related image resources on the Internet are searched by inputting a keyword. With the development of technology, according to an emerging image recognition technology, it can be implemented that a user searches other image resources on the Internet that are similar to an image by uploading the image or inputting a URL address of the image, and information related to the image can also be found at the same time.

However, in some scenarios, after the user uploads a person back image for image recognition, what the user obtains is information related to a person back, which makes an amount of information included in the image recognition result small, and thus, the image recognition requirement of the user cannot be met, and the image recognition result does not have a sense of surprise, resulting in insufficient user experience.

SUMMARY

Embodiments of the present disclosure provide an image recognition method and apparatus, an electronic device and a medium, to increase an amount of information of an image recognition result and enhance user experience.

In a first aspect, an embodiment of the present disclosure provides an image recognition method, applied to a server side, the method including: acquiring a to-be-recognized image sent by a client, and determining whether the to-be-recognized image is a back image; determining characteristic information of the to-be-recognized image in at least one dimension, in response to determining the to-be-recognized image being the back image; and determining a target front side image matching the to-be-recognized image according to the characteristic information, and returning the target front side image to the client, to cause the client to display the target front side image.

The above embodiment of the present disclosure has the following advantages or beneficial effects: by determining whether the to-be-recognized image sent by a user is the back image, determining, in response to the to-be-recognized image being the back image, the characteristic information of the to-be-recognized image in the at least one dimension, determining the target front side image matching the to-be-recognized image according to the characteristic information, and finally, returning the target front side image to the client to show the target front side image to the user, the technical effects that an amount of information of an image recognition result is increased and user experience is enhanced are achieved.

Alternatively, the method further includes: performing image recognition on the to-be-recognized image to obtain image recognition result information of the to-be-recognized image, and returning the image recognition result information of the to-be-recognized image to the client, to cause the client to display the image recognition result information of the to-be-recognized image.

The above embodiment of the present disclosure has the following advantages or beneficial effects: by performing the image recognition on the to-be-recognized image to determine the image recognition result information of the to-be-recognized image, and returning the image recognition result information of the to-be-recognized image to the client for the client to show the image recognition result information of the to-be-recognized image to the user, the user may acquire the information associated with the to-be-recognized image, thus achieving the technical effect of the image recognition performed on the to-be-recognized image.

Alternatively, the determining the target front side image matching the to-be-recognized image according to the characteristic information includes: matching the characteristic information with characteristic information of each candidate front side image in an image library in the at least one dimension, and using a candidate front side image corresponding to successfully matched characteristic information as the target front side image. Where the dimension includes at least one of skin color, body size, hair style, clothing or scene.

The above embodiment of the present disclosure has the following advantages or beneficial effects: by performing the matching on the characteristic information and the characteristic information of the each candidate front side image in the image library in the at least one dimension, and using the candidate front side image corresponding to the successfully matched characteristic information as the target front side image, the technical effect that the target front side image corresponding to the to-be-recognized image is determined from the image library according to the characteristic information of the to-be-recognized image is achieved, which lays a foundation for a subsequent step of returning the target front side image to the client and showing the target front side image to the user.

Alternatively, after determining the target front side image matching the to-be-recognized image, the method further includes: performing image recognition on the target front side image to obtain image recognition result information of the target front side image, and returning the image recognition result information of the target front side image to the client, to cause the client to display the image recognition result information of the target front side image.

The above embodiment of the present disclosure has the following advantages or beneficial effects: by performing the image recognition on the target front side image to determine the image recognition result information of the target front side image, and returning the image recognition result information of the target front side image to the client for the client to show the image recognition result information of the target front side image to the user, the user may acquire the information associated with the target front side image, thus achieving the technical effect of the image recognition performed on the to-be-recognized image.

In a second aspect, an embodiment of the present disclosure provides an image recognition method, applied to a client, the method including: sending a to-be-recognized image to a server side, to cause the server side to determine a target front side image matching the to-be-recognized image according to the to-be-recognized image; and acquiring the target front side image sent by the server side and displaying the target front side image in a visualization area.

The above embodiment of the present disclosure has the following advantages or beneficial effects: by sending the to-be-recognized image to the server side to cause the server side to determine the target front side image matching the to-be-recognized image, acquiring the target front side image sent by the server side, and displaying the target front side image in the visualization area, the technical effects that an amount of information of an image recognition result is increased and user experience is enhanced are achieved.

Alternatively, before acquiring the target front side image sent by the server side, the method further includes: acquiring image recognition result information of the to-be-recognized image sent by the server side, and displaying the image recognition result information of the to-be-recognized image in the visualization area.

The above embodiment of the present disclosure has the following advantages or beneficial effects: by acquiring the image recognition result information of the to-be-recognized image sent by the server side, and displaying the image recognition result information of the to-be-recognized image in the visualization area, a user may browse the image recognition result information of the to-be-recognized image in the visualization area of the client, which satisfies the technical effect that the user performs the image recognition on the to-be-recognized image.

Alternatively, the acquiring the target front side image sent by the server side and displaying the target front side image in the visualization area includes: acquiring the target front side image sent by the server side in response to detecting a touch operation of a user on a toggle button in the visualization area, and toggling, in the visualization area, the to-be-recognized image in a form of animation transition to display the target front side image.

The above embodiment of the present disclosure has the following advantages or beneficial effects: by acquiring the target front side image sent by the server side after the user touches the toggle button, and toggling, in the visualization area, the to-be-recognized image in the form of animation transition to show the target front side image, a sense of surprise is brought to the user from the image recognition result and the interaction, thus enhancing the user experience.

Alternatively, the method further includes: acquiring image recognition result information of the target front side image sent by the server side, and displaying the image recognition result information of the target front side image in the visualization area.

The above embodiment of the present disclosure has the following advantages or beneficial effects: by acquiring the image recognition result information of the target front side image sent by the server side and the target front side image and displaying the image recognition result information of the target front side image in the visualization area, the user may browse the image recognition result information of the target front side image in the visualization area of the client, and can not only acquire the image recognition result information of the to-be-recognized image but also the image recognition result information of the target front side image corresponding to the to-be-recognized image, thus achieving the technical effects of increasing the amount of the information of the image recognition result and enhancing the user experience.

In a third aspect, an embodiment of the present disclosure further provides an image recognition apparatus, configured at a server side, the apparatus including: a to-be-recognized image acquiring module, configured to acquire a to-be-recognized image sent by a client, and determine whether the to-be-recognized image is a back image; a characteristic information determining module, configured to determine characteristic information of the to-be-recognized image in at least one dimension in response to determining the to-be-recognized image being the back image; and a target front side image determining module, configured to determine a target front side image matching the to-be-recognized image according to the characteristic information, and return the target front side image to the client to cause the client to display the target front side image.

In a fourth aspect, an embodiment of the present disclosure further provides an image recognition apparatus, configured at a client, the apparatus including: a to-be-recognized image sending module, configured to send a to-be-recognized image, uploaded by a user, to a server side, to cause the server side to determine a target front side image matching the to-be-recognized image; and a target front side image displaying module, configured to acquire the target front side image sent by the server side, and display the target front side image in a visualization area.

In a fifth aspect, an embodiment of the present disclosure further provides an electronic device, including: at least one processor; and a memory, where the memory stores instructions executable by the at least one processor, and the instructions can be executed by the at least one processor, to cause the at least one processor to perform the image recognition method according to any embodiment of the present disclosure.

In a sixth aspect, an embodiment of the present disclosure further provides a non-transitory computer readable storage medium, storing computer instructions, where the computer instructions are used to cause a computer to perform the image recognition method according to any embodiment of the present disclosure.

Other effects of the above alternative implementations will be described hereinafter in combination with specific embodiments.

BRIEF DESCRIPTION OF THE DRAWINGS

Accompanying drawings are used for a better understanding of the solution, and do not constitute a limitation to the present disclosure.

FIG. 2B is a schematic diagram of a target front side image according to the second embodiment of the present disclosure;

FIG. 3A is a schematic flowchart of an image recognition method according to a third embodiment of the present disclosure;

DETAILED DESCRIPTION OF EMBODIMENTS

Example embodiments of the present disclosure are described below in combination with accompanying drawings, and various details of the embodiments of the present disclosure are included in the description to facilitate understanding, and should be considered merely as examples. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

First Embodiment

Figure 1A:
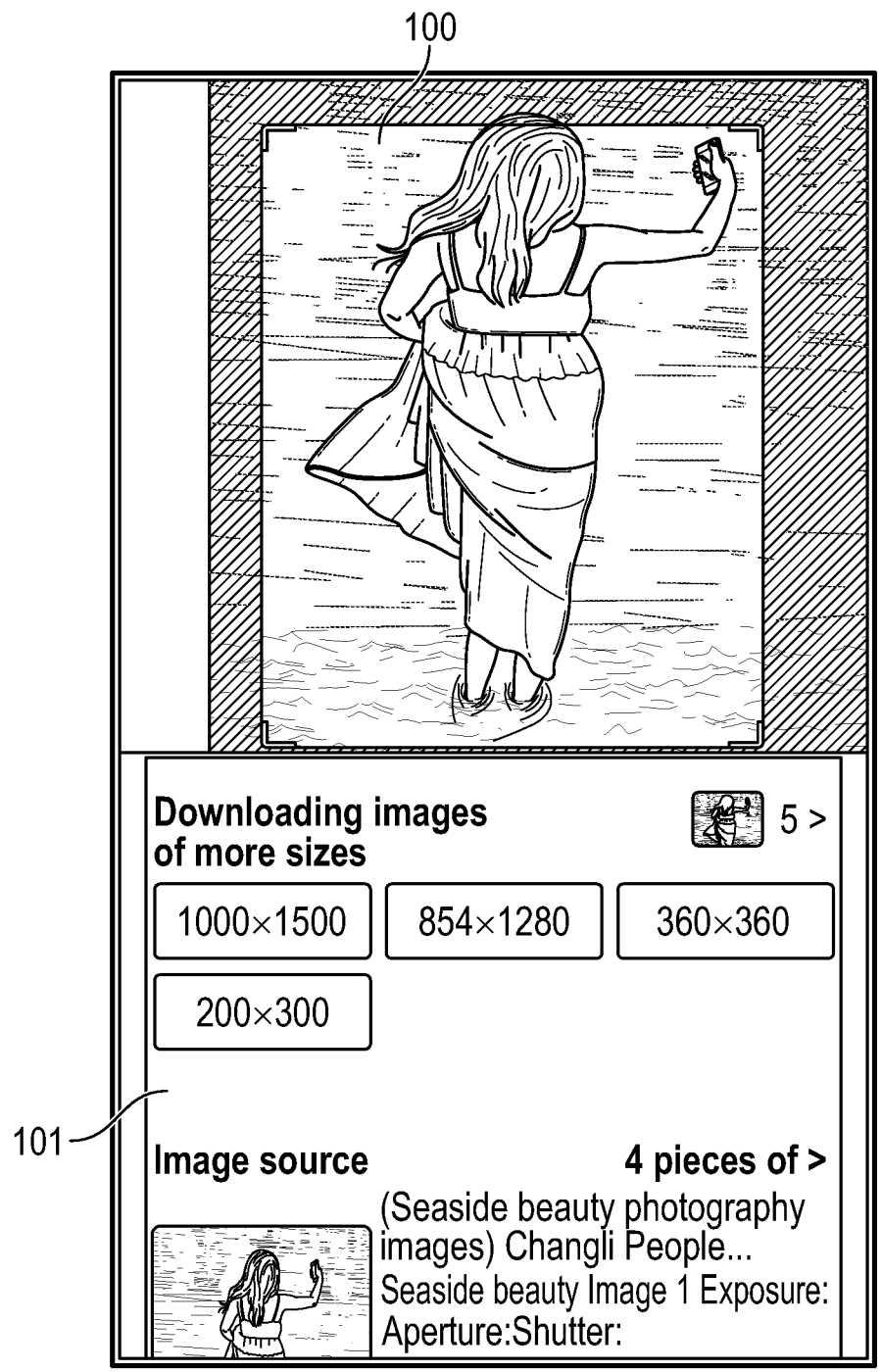
FIG. 1A is a schematic diagram of an existing image recognition result according to a first embodiment of the present disclosure.

In the existing image recognition technology, when a user uploads a person back image for image recognition, what the user obtains is information related to a person back. FIG. 1A is a schematic diagram of an existing image recognition result. In FIG. 1A, 100 represents a back image uploaded by the user, and 101 represents information related to the person back in the image.

Figure 1B:
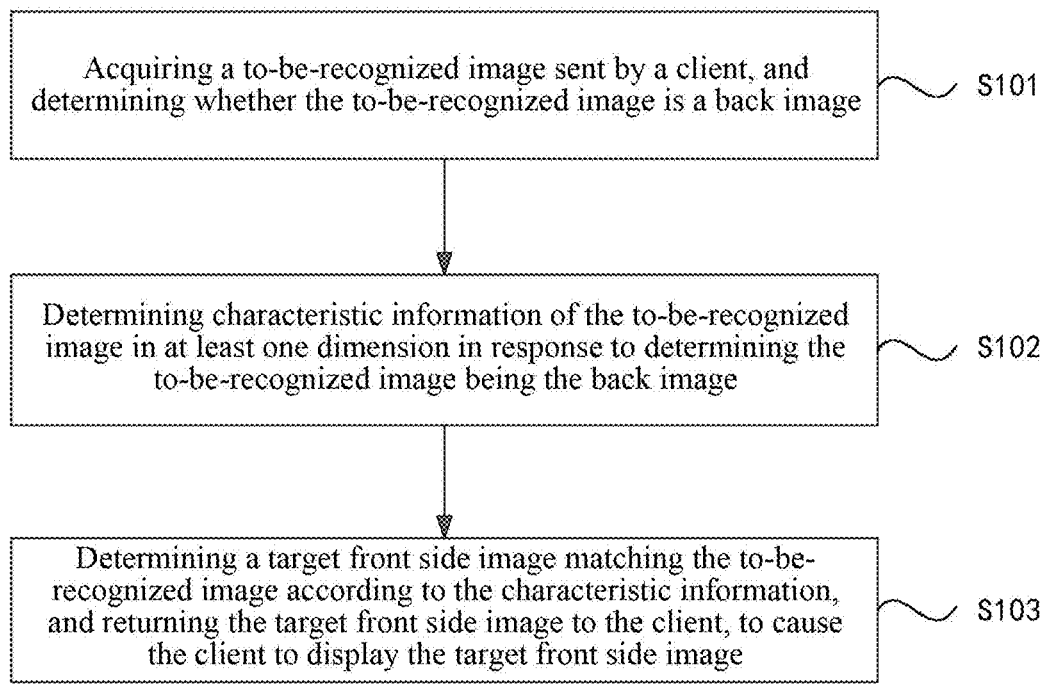
FIG. 1B is a schematic flowchart of an image recognition method according to the first embodiment of the present disclosure.

FIG. 1B is a schematic flowchart of an image recognition method according to the first embodiment of the present disclosure. This embodiment is applicable to a situation where a user wants to browse a front side image corresponding to a sent back image. The method may be applied to a server side, and may be performed by an image recognition apparatus configured at the server side and provided in embodiments of the present disclosure. The apparatus may be implemented by means of software and/or hardware. As shown in FIG. 1B, the method may include the following steps.

S101, acquiring a to-be-recognized image sent by a client, and determining whether the to-be-recognized image is a back image.

Here, the server side includes, but not limited to, VC++, Delphi, or the like for writing, and preferably uses a socket interface to receive data sent by the client. The format of the to-be-recognized image includes, but not limited to, a RAW format, a BMP format, a JPEG format, a PNG format, and the like. The back image includes, but not limited to, a real person back image, an anime character back image, a movie character back image, an animal back image, and the like.

Specifically, after acquiring the to-be-recognized image sent by the user, the server side first determines whether an object in the to-be-recognized image is a target object, according to a preset target detection algorithm. Here, the target object includes a person or an animal, and the target detection algorithm includes, but not limited to, a YOLO algorithm, an R-CNN algorithm, a Fast-RCNN algorithm, etc. If it is determined that the object in the to-be-recognized image is the target object, a characteristic detection is performed on the to-be-recognized image to determine whether the to-be-recognized image includes a target characteristic. Here, the target characteristic includes, but not limited to, an eye, a mouth, a nose, an eyebrow, a tooth, a pupil, or the like. If it is determined that the to-be-recognized image does not include the target characteristic, it is determined that the to-be-recognized image is the back image, and correspondingly, if it is determined that the to-be-recognized image includes the target characteristic, it is determined that the to-be-recognized image is not the back image.

By acquiring the to-be-recognized image sent by the client and determining whether the to-be-recognized image is the back image, a foundation is laid for a subsequent determination for characteristic information of the to-be-recognized image in at least one dimension, which avoids the problem that the amount of computation is excessive due to the determination for the characteristic information of all to-be-recognized images.

S102, determining characteristic information of the to-be-recognized image in at least one dimension, when it is determined that the to-be-recognized image is the back image.

Here, the dimension includes, but not limited to, at least one of skin color, body size, hair style, clothing or scene. Each dimension includes different characteristic information. For example, the dimension of "skin color" includes, but not limited to, white, wheat color, dark or other characteristic information. The dimension of "body size" includes, but not limited to, underweight, moderate, overweight, fat or other characteristic information. The dimension of "hair style" includes, but not limited to, short hair, medium-length hair, long hair or other characteristic information. The dimension of "clothing" includes, but not limited to, short skirt, long skirt, vest, jacket or other characteristic information. The dimension of "scene" includes, but not limited to, seaside, sand beach, subway, office or other characteristic information.

Figure 1C:
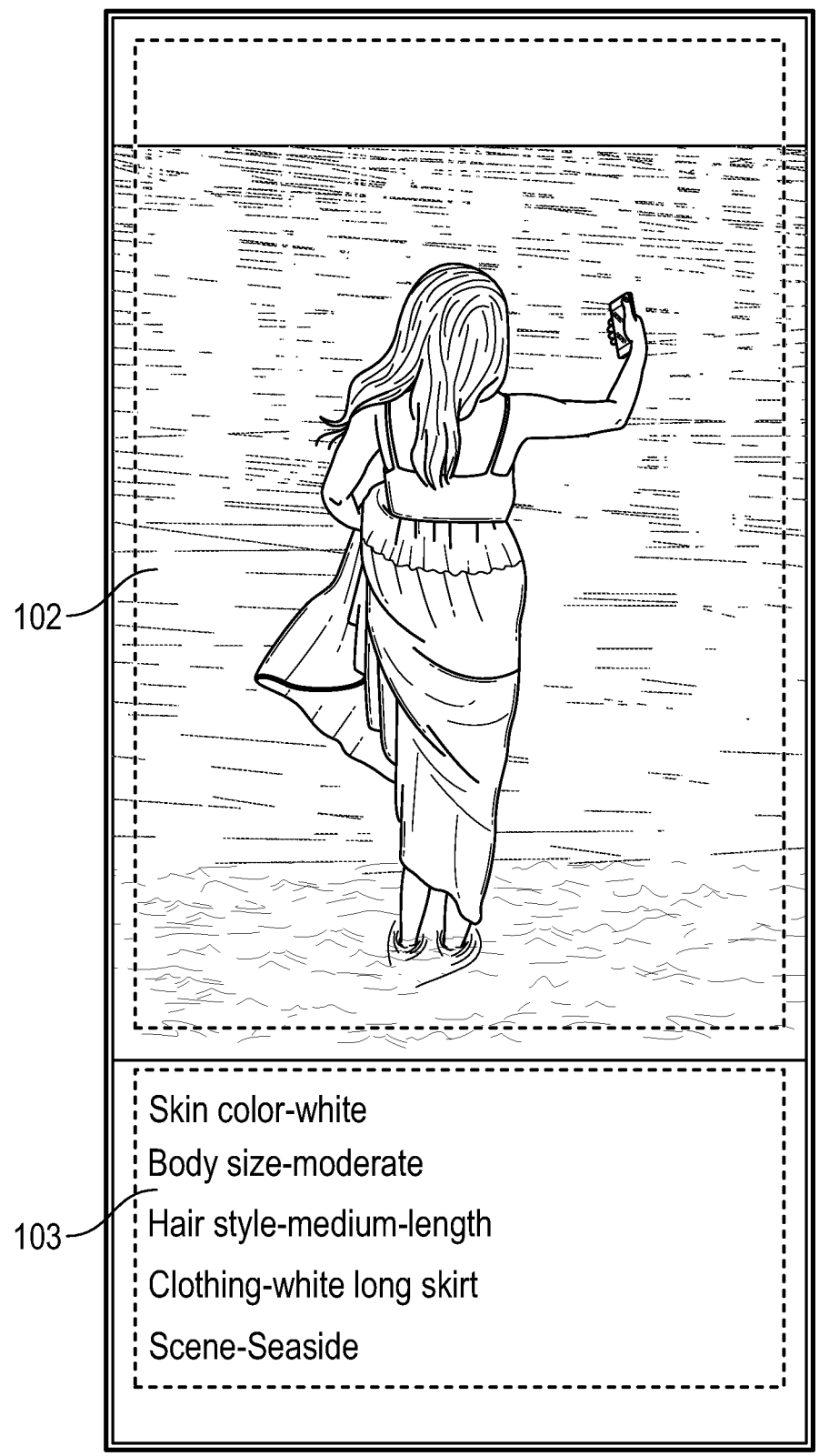
FIG. 1C is a schematic diagram of dimension information of a to-be-recognized image according to the first embodiment of the present disclosure.

Specifically, the server side inputs the to-be-recognized image into a pre-established characteristic information recognition model, to obtain the characteristic information of the to-be-recognized image in the at least one dimension. Here, the characteristic information recognition model is a neural network model, which is constructed by: acquiring massive back images as training sample images, and annotating manually characteristic information of each training sample image to obtain the characteristic information of the each training sample image in the at least one dimension, and finally, training the respective training sample images and corresponding characteristic information to obtain the characteristic information recognition model. FIG. 1C is a schematic diagram of dimension information of a to-berecognized image. Here, 102 is the to-be-recognized image and 103 is the dimension information of the to-be-recognized image.

By determining the characteristic information of the to-be-recognized image in the at least one dimension when it is determined that the to-be-recognized image is the back image, a data foundation is laid for a subsequent determination for a target front side image matching the to-be-recognized image, which ensures that the final determination for the target front side image corresponding to the to-be-recognized image can be successfully completed.

S103, determining a target front side image matching the to-be-recognized image according to the characteristic information, and returning the target front side image to the client, to cause the client to display the target front side image.

Specifically, according to the characteristic information, the server side performs a lookup in an image library to determine the target front side image matching the to-be-recognized image. Here, the image library includes front side images crawled from numerous network communities, numerous Internet forums, and numerous web pages, and characteristic information corresponding to the front side images and determined by the characteristic information recognition model. The front side images and the corresponding characteristic information are associated and stored in the image library, and the form in which the front side images and the corresponding characteristic information are stored includes a form of key value (KV) pair. Here, the key value Key refers to a front side image, and the data value Value refers to characteristic information. After determining the target front side image, the server side returns the target front side image to the client for the client to show the target front side image in a preset visualization area on a screen, for the user to view.

By determining the target front side image matching the to-be-recognized image according to the characteristic information, and returning the target front side image to the client to cause the client to display the target front side image, the sense of surprise brought to the user by the image recognition result is increased, thereby improving the user experience.

According to the technical solution provided in the embodiment of the present disclosure, by determining whether the to-be-recognized image sent by the user is the back image, determining, in response to the to-be-recognized image being the back image, the characteristic information of the to-be-recognized image in the at least one dimension, determining the target front side image matching the to-be-recognized image according to the characteristic information, and finally, returning the target front side image to the client to show the target front side image to the user, the technical effects that the amount of the information of the image recognition result is increased and the user experience is enhanced are achieved.

Second Embodiment

Figure 2A:
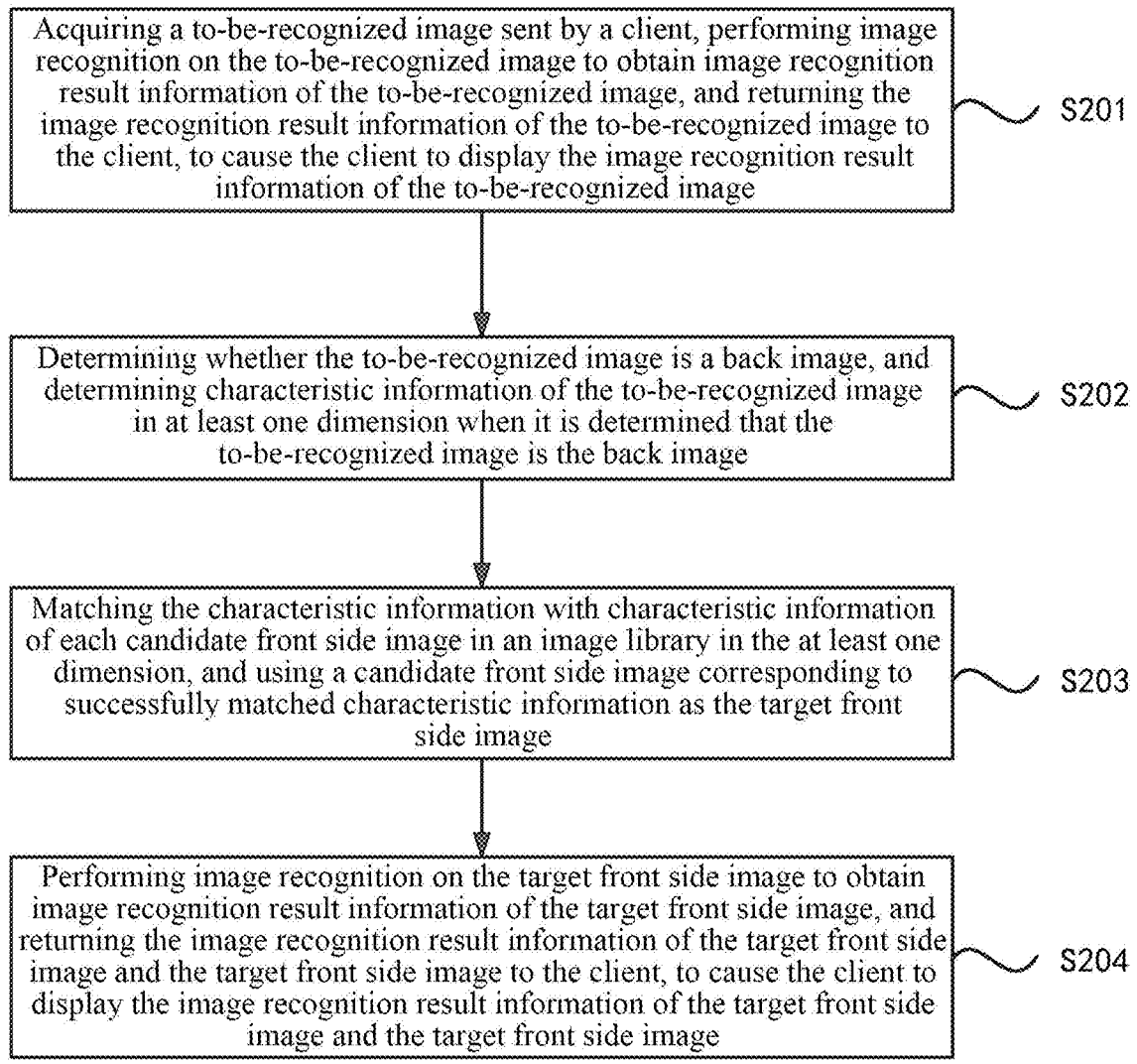
FIG. 2A is a schematic flowchart of an image recognition method according to a second embodiment of the present disclosure.

FIG. 2A is a schematic flowchart of an image recognition method according to the second embodiment of the present disclosure. This embodiment provides a specific implementation for the first embodiment. As shown in FIG. 2A, the method may include the following steps.

S201, acquiring a to-be-recognized image sent by a client, performing image recognition on the to-be-recognized image to obtain image recognition result information of the to-be-recognized image, and returning the image recognition result information of the to-be-recognized image to the client, to cause the client to display the image recognition result information of the to-be-recognized image.

Here, the image recognition is performed on to-be-recognized image through an existing image recognition technology, to obtain the image recognition result information of the to-be-recognized image.

Specifically, after acquiring the to-be-recognized image sent by a user, a server side performs a characteristic extraction on the to-be-recognized image according to a preset characteristic extraction algorithm (e.g., a SIFT algorithm, a fingerprint function algorithm, or a hash function algorithm), to obtain an image characteristic of the to-be-recognized image. The server side encodes the image characteristic to obtain a characteristic encoding of the to-be-recognized image. Here, the encoding approach includes one-hot encoding, label encoding, or the like. Finally, the server side performs a global similarity calculation in the image library according to the characteristic encoding, sets a threshold value according to required robustness, uses an image having a similarity greater than the threshold value as a similar image, uses pre-stored related information of the similar image as the image recognition result information of the to-be-recognized image, and returns the image recognition result information to the client for the client to show, in a visualization area, the image recognition result information of the to-be-recognized image to the user. Here, the image recognition result information of the to-be-recognized image includes, but not limited to, image source information, person clothing information, article information, scene information (e.g., a scenic spot), etc.

By performing the image recognition on the to-be-recognized image to determine the image recognition result information of the to-be-recognized image, and returning the image recognition result information of the to-be-recognized image to the client for the client to show the image recognition result information of the to-be-recognized image to the user, the user may acquire the information associated with the to-be-recognized image, thus achieving the technical effect of the image recognition performed on the to-be-recognized image.

S202, determining whether the to-be-recognized image is a back image, and determining characteristic information of the to-be-recognized image in at least one dimension when it is determined that the to-be-recognized image is the back image.

S203, matching the characteristic information with characteristic information of each candidate front side image in an image library in the at least one dimension, and using a candidate front side image corresponding to successfully matched characteristic information as the target front side image.

Here, the dimension includes at least one of skin color, body size, hair style, clothing or scene.

For example, it is assumed that the characteristic information of the to-be-recognized image includes: "skin color: white," "body size: moderate," "hair style: medium-length hair," "clothing: white long skirt" and "scene: seaside." The characteristic information of the candidate front side image A includes: "skin color: white," "body size: moderate," "hair style: medium-length hair," "clothing: white long skirt" and "scene: sand beach." Since "seaside" in the characteristic information of the to-be-recognized image is different from "sand beach" in the characteristic information of the candidate front side image A, the candidate front side image A is not the target front side image of the to-be-recognized image. The characteristic information of the candidate front side image B includes: "skin color: white," "body size: moderate," "hair style: medium-length hair," "clothing: white long skirt" and "scene: seaside." The characteristic information of the to-be-recognized image and the characteristic information of the candidate front side image B are exactly the same, that is, the matching is successful, and thus, the candidate front side image B is used as the target front side image of the to-be-recognized image. As shown in FIG. 2B, FIG. 2B is a schematic diagram of a target front side image. Here, 200 represents the to-be-recognized image, 201 represents the candidate front side image A on which matching of characteristic information is unsuccessfully performed, and 202 represents the candidate front side image B on which the matching of the characteristic information is successfully performed, that is, the target front side image.

S204, performing image recognition on the target front side image to obtain image recognition result information of the target front side image, and returning the image recognition result information of the target front side image and the target front side image to the client, to cause the client to display the image recognition result information of the target front side image and the target front side image.

Specifically, the server side performs the characteristic extraction on the target front side image according to the preset characteristic extraction algorithm (e.g., the SIFT algorithm, the fingerprint function algorithm, or the hash function algorithm), to obtain an image characteristic of the target front side image. The server side encodes the image characteristic to obtain a characteristic encoding of the target front side image. Here, the encoding approach includes the one-hot encoding, the label encoding, or the like. Finally, the server side performs a global similarity calculation in the image library according to the characteristic encoding, sets a threshold value according to required robustness, uses an image having a similarity greater than the threshold value as a similar image, uses pre-stored related information of the similar image as the image recognition result information of the target front side image, and finally returns the image recognition result information of the target front side image and the target front side image to the client for the client to show, in the visualization area, the image recognition result information of the target front side image and the target front side image to the user. Here, the image recognition result information of the target front side image includes, but not limited to, image source information, person clothing information, article information, scene information (e.g., a scenic spot), etc.

According to the technical solution provided in the embodiment of the present disclosure, by matching the characteristic information with the characteristic information of the each candidate front side image in the image library in the at least one dimension, and using the candidate front side image corresponding to the successfully matched characteristic information as the target front side image; and by performing the image recognition on the target front side image to determine the image recognition result information of the target front side image, and returning the image recognition result information of the target front side image and the target front side image to the client to cause the client to display the image recognition result information of the target front side image and the target front side image, the technical effect that the front side image is shown according to the back image is achieved, such that the image recognition result includes not only the image recognition result information of the to-be-recognized image, but also the image recognition result information of the target front side image corresponding to the to-be-recognized image, which increases the amount of the information of the image recognition result and brings the sense of surprise to the user from the image recognition result, thus enhancing the user experience.

Third Embodiment

FIG. 3A is a schematic flowchart of an image recognition method according to the third embodiment of the present disclosure. This embodiment is applicable to a situation where a user wants to browse a front side image corresponding to a sent back image. The method may be applied to a client, and may be performed by an image recognition apparatus configured at the client and provided in embodiments of the present disclosure. The apparatus may be implemented by means of software and/or hardware. As shown in FIG. 3A, the method may include the following steps.

S301, sending a to-be-recognized image to a server side, to cause the server side to determine a target front side image matching the to-be-recognized image according to the to-be-recognized image.

Here, the client includes, but not limited to, an APP (Application) or an applet installed on a terminal.

Figure 3B:
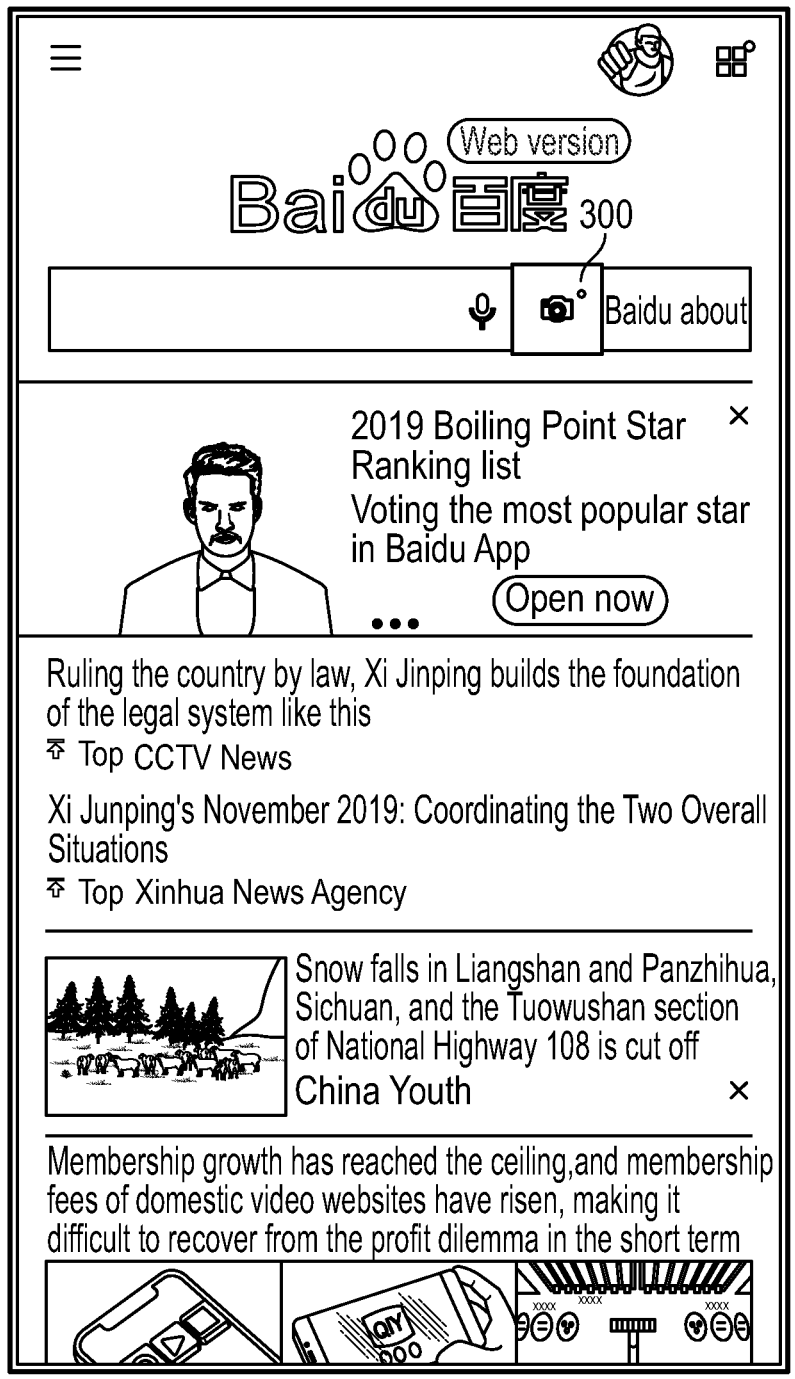
FIG. 3B is a schematic diagram of an upload page of a to-be-recognized image according to the third embodiment of the present disclosure.

Specifically, the user accesses an upload page of the to-be-recognized image in the client, and sends the to-be-recognized image stored in the terminal to the server side through the upload page, the terminal including a mobile terminal (e.g., a smartphone or a tablet computer) and a fixed terminal (e.g., a personal computer or an all-in-one machine). FIG. 3B is a schematic diagram of an upload page of a to-be-recognized image. Here, 300 represents an upload button. After clicking the upload button, the user selects any image stored in the terminal as the to-be-recognized image and sends the image to the server side, to cause the server side to determine the target front side image matching the to-be-recognized image according to the to-be-recognized image.

S302, acquiring the target front side image sent by the server side and displaying the target front side image in a visualization area.

Here, the client is provided with the visualization area, and in the visualization area, information including image information, text information, video information, etc. may be shown to the user.

Specifically, the client acquires the target front side image sent by the server side, and renders the target front side image to the visualization area, and thus, the user may directly view the target front side image corresponding to the to-be-recognized image in the visualization area.

According to the technical solution provided in the embodiment of the present disclosure, by sending the to-be-recognized image to the server side, acquiring the target front side image corresponding to the to-be-recognized image sent by the server side, and displaying the target front side image in the visualization area, the technical effect that the front side image is recognized according to the back image is achieved, which increases the amount of the information of the image recognition result, thus enhancing the user experience.

Fourth Embodiment

Figure 4A:
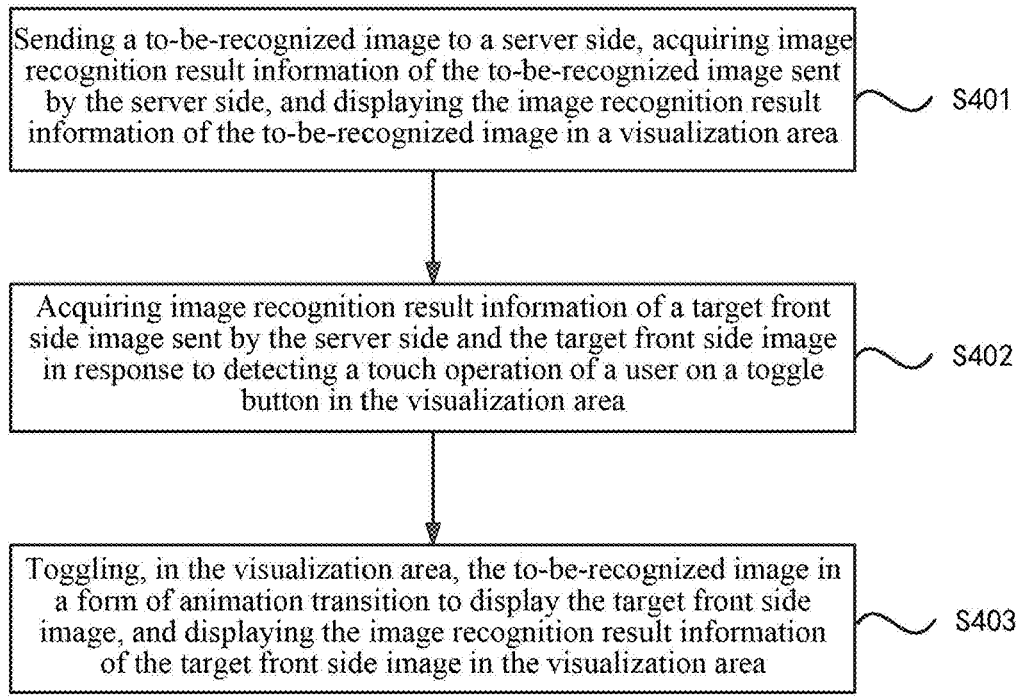
FIG. 4A is a schematic flowchart of an image recognition method according to a fourth embodiment of the present disclosure.

FIG. 4A is a schematic flowchart of an image recognition method according to the fourth embodiment of the present disclosure. This embodiment provides a specific implementation for the third embodiment. As shown in FIG. 4A, the method may include the following steps.

S401, sending a to-be-recognized image to a server side, acquiring image recognition result information of the to-be-recognized image sent by the server side, and displaying the image recognition result information of the to-be-recognized image in a visualization area.

S402, acquiring image recognition result information of a target front side image sent by the server side and the target front side image in response to detecting a touch operation of a user on a toggle button in the visualization area.

Specifically, after the user sends the to-be-recognized image to the server side through the client, what shown in the visualization area on the screen of the client is the to-be-recognized image uploaded by the user, and the toggle button is pre-generated in the visualization area of the client. After the user clicks the toggle button, the client sends a request to the server side, to control the server side to send the image recognition result information of the target front side image and the target front side image to the client.

Figure 4B:
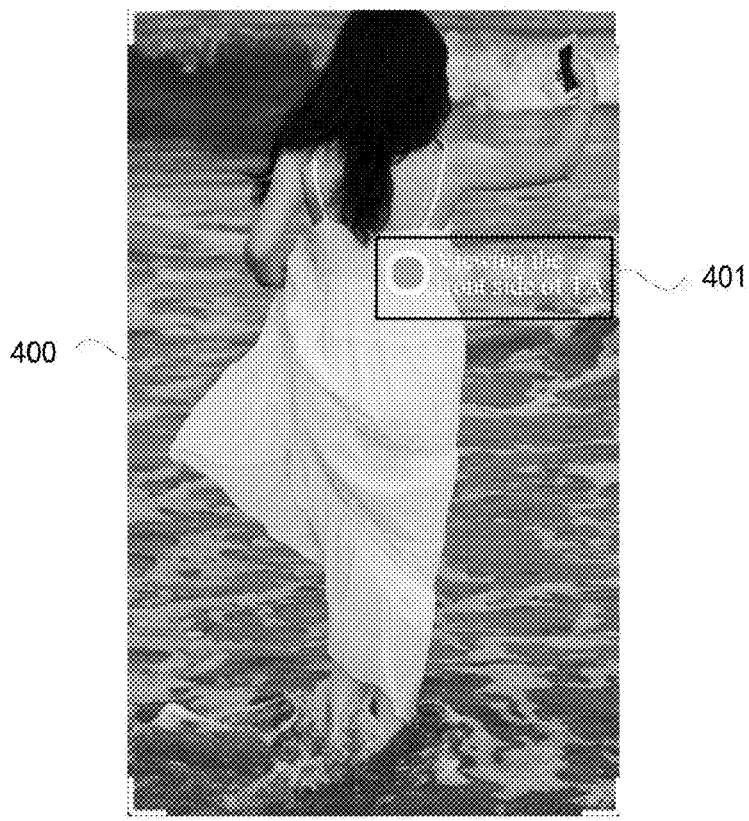
FIG. 4B is a schematic diagram of a bootstrap toggle button according to the fourth embodiment of the present disclosure.

For example, FIG. 4B is a schematic diagram of a toggle button. Here, 400 represents a to-be-recognized image and 401 represents a bootstrap toggle button.

S403, toggling, in the visualization area, the to-be-recognized image in a form of animation transition to display the target front side image, and displaying the image recognition result information of the target front side image in the visualization area.

Specifically, in the visualization area, the client toggles the originally shown to-be-recognized image in the form of animation transition to show the target front side image, the form of the animation transition including, but not limited to, smooth fade-out, cut-out, dissolving, shutter-out-horizontal, or the like. Moreover, the image recognition result information of the target front side image is displayed around the target front side image.

Figure 4C:
FIG. 4C is a schematic diagram in which a target front side image is shown through animation transition according to the fourth embodiment of the present disclosure.

For example, FIG. 4C is a schematic diagram in which a target front side image is shown through animation transition. Here, 400 represents a to-be-recognized image and 402 represents a target front side image.

According to the technical solution provided in the embodiments of the present disclosure, by toggling, in the visualization area, the to-be-recognized image in the form of animation transition to display the target front side image if the user performs the touch operation on the toggle button, and by displaying the image recognition result information of the target front side image in the visualization area, the amount of the information of the image recognition result is increased and the process of the image recognition becomes more interesting, which brings the user a sense of surprise, thus improving the user experience.

Fifth Embodiment

Figure 5:
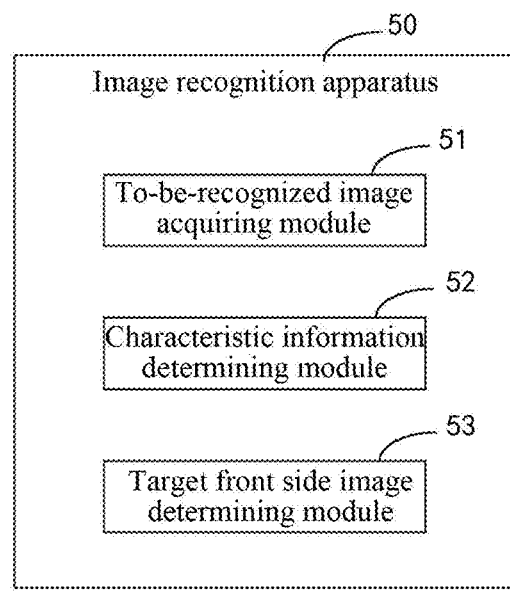
FIG. 5 is a schematic structural diagram of an image recognition apparatus provided by a fifth embodiment of the present disclosure.

FIG. 5 is a schematic structural diagram of an image recognition apparatus 50 provided by a fifth embodiment of the present disclosure. The apparatus is configured at a server side, may perform the image recognition method provided by any of the first embodiment and the second embodiment, and possesses functional modules for performing the method and corresponding beneficial effects. As shown in FIG. 5, the apparatus may include: a to-be-recognized image acquiring module 51, configured to acquire a to-be-recognized image sent by a client, and determine whether the to-be-recognized image is a back image; a characteristic information determining module 52, configured to determine characteristic information of the to-be-recognized image in at least one dimension when it is determined that the to-be-recognized image is the back image; and a target front side image determining module 53, configured to determine a target front side image matching the to-be-recognized image according to the characteristic information, and return the target front side image to the client to cause the client to display the target front side image On the basis of the above embodiment, the apparatus further includes a to-be-recognized image recognizing module, specifically configured to: perform image recognition on the to-be-recognized image to obtain image recognition result information of the to-be-recognized image, and return the image recognition result information of the to-be-recognized image to the client, to cause the client to display the image recognition result information of the to-be-recognized image.

On the basis of the above embodiments, the target front side image determining module 53 is specifically configured to: match the characteristic information with characteristic information of each candidate front side image in an image library in the at least one dimension, and use a candidate front side image corresponding to successfully matched characteristic information as the target front side image. Here, the dimension includes at least one of skin color, body size, hair style, clothing or scene.

On the basis of the above embodiments, the apparatus further includes a target front side image recognizing module, specifically configured to: perform image recognition on the target front side image to obtain image recognition result information of the target front side image, and return the image recognition result information of the target front side image to the client to cause the client to display the image recognition result information of the target front side image.

The image recognition apparatus 50 provided in the embodiments of the present disclosure may perform the image recognition method provided by any of the first embodiment and the second embodiment, and possesses the functional modules for performing the method and the corresponding beneficial effects. For technical details not described in detail in this embodiment, reference may be made to the image recognition method provided by any of the first embodiment and the second embodiment of the present disclosure.

Sixth Embodiment

Figure 6:
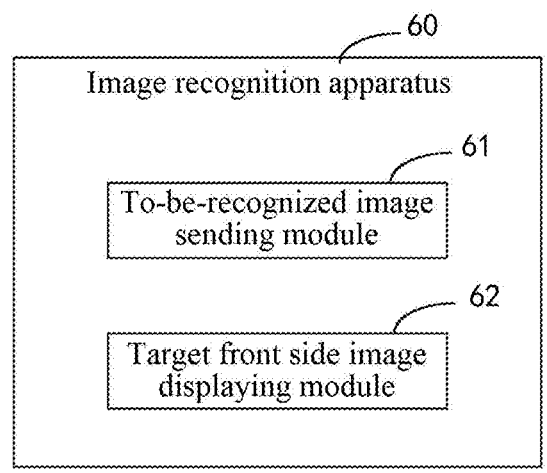
FIG. 6 is a schematic structural diagram of an image recognition apparatus provided by a sixth embodiment of the present disclosure.

FIG. 6 is a schematic structural diagram of an image recognition apparatus 60 provided by the sixth embodiment of the present disclosure. The apparatus is configured at a client, may perform the image recognition method provided by any of the third embodiment and the fourth embodiment, and possesses functional modules for performing the method and corresponding beneficial effects.

As shown in FIG. 6, the apparatus may include: a to-be-recognized image sending module 61, configured to send a to-be-recognized image, uploaded by a user, to a server side, to cause the server side to determine a target front side image matching the to-be-recognized image; and a target front side image displaying module 62, configured to acquire the target front side image sent by the server side, and display the target front side image in a visualization area.

On the basis of the above embodiment, the apparatus further includes a first related information acquiring module, specifically configured to: acquire image recognition result information of the to-be-recognized image sent by the server side, and display the image recognition result information of the to-be-recognized image in the visualization area.

On the basis of the above embodiments, the target front side image displaying module 62 is specifically configured to: acquire the target front side image sent by the server side in response to detecting a touch operation of a user on a toggle button in the visualization area, and toggle, in the visualization area, the to-be-recognized image in a form of animation transition to display the target front side image.

On the basis of the above embodiments, the apparatus further includes a second related information acquiring module, specifically configured to: acquire image recognition result information of the target front side image sent by the server side, and display the image recognition result information of the target front side image in the visualization area.

The image recognition apparatus 60 provided in the embodiments of the present disclosure may perform the image recognition method provided by any of the third embodiment and the fourth embodiment, and possesses the functional modules for performing the method and the corresponding beneficial effects. For technical details not described in detail in this embodiment, reference may be made to the image recognition method provided by any of the third embodiment and the fourth embodiment of the present disclosure.

According to embodiments of the present disclosure, the present disclosure further provides an electronic device and a readable storage medium.

Figure 7:
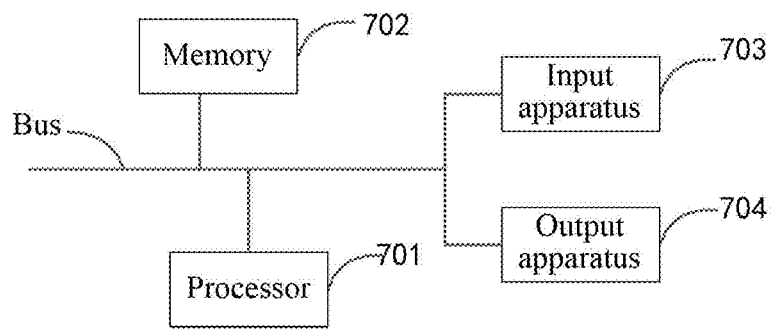
FIG. 7 is a block diagram of an electronic device adapted to implement the image recognition method according to embodiments of the present disclosure.

As shown in FIG. 7, FIG. 7 is a block diagram of an electronic device of an image recognition method according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 7, the electronic device includes one or more processors 701, a memory 702, and an interface for connecting parts, the interface including a high speed interface and a low speed interface. The parts are interconnected using different buses, and may be mounted on a common motherboard or in other ways as needed. The processors may process instructions executed within the electronic device, the instructions including instructions stored in the memory or on the memory to display graphical information of a GUI on an external input/output apparatus such as a display device coupled to the interface. In other implementations, a plurality of processors and/or a plurality of buses may be used, if desired, along with a plurality of memories. Also, a plurality of electronic devices may be connected, and each device provides a portion of necessary operations (e.g., as a server array, a group of blade servers or a multi-processor system). In FIG. 7, one processor 701 is taken as an example.

The memory 702 is a non-transitory computer readable storage medium provided in the present disclosure. Here, the memory stores instructions executable by at least one processor, to cause the at least one processor to perform the image recognition method provided in embodiments of the present disclosure. The non-transitory computer readable storage medium in embodiments of the present disclosure stores a computer instructions, the computer instructions being used to cause a computer to perform the image recognition method provided in embodiments of the present disclosure.

As the non-transitory computer readable storage medium, the memory 702 may be used to store a non-transitory software program, a non-transitory computer executable program and a module such as a program instruction/module (as an example, the to-be-recognized image acquiring module 51, the characteristic information determining module 52 and the target front side image determining module 53 shown in FIG. 5, and as another example, the to-be-recognized image sending module 61 and the target front side image displaying module 62 shown in FIG. 6) corresponding to the image recognition method in the embodiments of the present disclosure. The processor 701 executes various functional applications and data processing of the server by running the non-transitory software programs, the instructions and the modules stored in the memory 702, i.e., implements the image recognition method in the above embodiments of the method.

The memory 702 may include a storage program area and a storage data area. Here, the storage program area may store an operating system and an application program required for at least one function. The storage data area may store data, etc. created according to the use of an electronic device of performing image recognition on an image. In addition, the memory 702 may include a high speed random access memory, and may also include a non-transitory memory, for example, at least one magnetic disk storage device, a flash storage device, or other non-transitory solid state storage devices. In some embodiments, the memory 702 may alternatively include a memory disposed remotely relative to the processor 701. The remote memory may be connected to the electronic device for performing image recognition on an image via a network. Examples of such network include, but not limited to, the Internet, an enterprise intranet, a block chain network, a local area network, a mobile communication network, and a combination thereof.

The electronic device of the image recognition method may further include: an input apparatus 703 and an output apparatus 704. The processor 701, the memory 702, the input apparatus 703 and the output apparatus 704 may be connected via a bus or in other ways. In FIG. 7, the connection via a bus is taken as an example.

The input apparatus 703 may receive an inputted number or inputted character information, and generate a key signal input related to the user setting and functional control of the electronic device of performing image recognition on an image. For example, the input apparatus is a touch screen, a keypad, a mouse, a track pad, a touch pad, a pointing stick, one or more mouse buttons, a track ball, a joystick, or the like. The output apparatus 704 may include a display device, an auxiliary lighting apparatus (e.g., an LED), a tactile feedback apparatus (e.g., a vibration motor), etc. The display device may include, but not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, electronic device and/or apparatus (e.g., a magnetic disk, an optical disk, a memory and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a CRT (cathode ray tube)) or an LCD (liquid crystal display) monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including an acoustic input, a speech input, or a tactile input.

The systems and techniques described here may be implemented in a computing system (e.g., a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN), a block chain network and the Internet.

The computer system may include a client and a server. The client and the server are generally remote from each other and typically interact through the communication network. The relationship between the client and the server is generated through computer programs running on the respective computer and having a client-server relationship to each other.

According to the technical solution of the embodiments of the present disclosure, by determining whether a to-be-recognized image sent by a user is a back image, determining, in response to the to-be-recognized image being the back image, characteristic information of the to-be-recognized image in at least one dimension, determining a target front side image matching the to-be-recognized image according to the characteristic information, and finally, returning the target front side image to the client to show the target front side image to the user, the technical effects that an amount of information of an image recognition result is increased and user experience is enhanced are achieved.

It should be understood that the various forms of processes shown above may be used to re-sort, add or delete steps. For example, the steps described in the embodiments of the present disclosure may be performed in parallel, sequentially, or in a different order. As long as the desired result of the technical solution disclosed in the present disclosure can be achieved, no limitation is made herein.

The above embodiments do not constitute a limitation to the scope of protection of the present disclosure. It should be understood by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. An image recognition method, applied to a client, the method comprising:
   presenting an upload button in an upload page, so that a user clicks the upload button and selects any image stored in the terminal as a to-be-recognized image;
   in response to the to-be-recognized image being a back image, sending, through the upload page, the back image to a server side, to cause the server side to search an image library for front side images and match the front side images with the back image to determine a target front side image matching the back image from the front side images, wherein the image library stores a plurality of front side images and characteristic information corresponding to the plurality of front side images in a form of key value pair, wherein a key of the key value pair refers to a front side image, and a data value of the key value pair refers to the characteristic information;
   presenting the back image in a visualized area on a screen of the client, and a toggle button is pre-generated in the visualized area; and
   acquiring the target front side image sent by the server side in response to detecting a touch operation of the user on the toggle button in the visualization area, and displaying the target front side image in a visualization area by toggling, in the visualization area, the back image in a form of animation transition to display the target front side image.

2. The method according to claim 1, wherein before acquiring the target front side image sent by the server side, the method further comprises:
   acquiring image recognition result information of the back image sent by the server side, and displaying the image recognition result information of the back image in the visualization area.

3. The method according to claim 1, further comprising:
   acquiring image recognition result information of the target front side image sent by the server side, and displaying the image recognition result information of the target front side image around the target front side image in the visualization area.

4. The method according to claim 3, wherein the image recognition result information of the target front side image comprises at least one of: image source information, person clothing information, article information, or scene information.

5. The method according to claim 1, wherein the form of the animation transition comprises one of: a smooth fade-out, cut-out, dissolving, or shutter-out-horizontal.

6. The method according to claim 1, wherein toggling, in the visualization area, the back image in the form of animation transition to display the target front side image comprises:
- toggling, in the visualization area, the back image in a form of animation transition to display a sequence of images from the to-be-recognized image to the target front side image sequentially.

7. An electronic device, comprising:
at least one processor; and
a memory,
wherein the memory stores instructions executable by the at least one processor, and the instructions, when executed by the at least one processor, cause the at least one processor to perform the method according to claim 1.

8. A non-transitory computer readable storage medium, storing computer instructions, wherein the computer instructions, when executed by a computer, cause the computer to perform the method according to claim 1.

* * * * *